United States Patent [19]
Chen et al.

[11] Patent Number: 6,102,501
[45] Date of Patent: Aug. 15, 2000

[54] PROTECTIVE COVER FOR A FRONT PANEL OF A PERSONAL COMPUTER HOUSING

[75] Inventors: Ching-Chiang Chen; Hsiu-Mei Huang; Cheng-Hsuen Chien, all of Taipei, Taiwan

[73] Assignee: Lite-On Enclosure Inc., Taipei, Taiwan

[21] Appl. No.: 09/384,050

[22] Filed: Aug. 27, 1999

[51] Int. Cl.[7] .................................................. A47B 81/00
[52] U.S. Cl. ..................................... 312/223.2; 312/265.6; 312/293.3; 361/683
[58] Field of Search ........................... 312/223.1, 223.2, 312/265.5, 265.6, 263, 257.1, 293.3; 361/683, 685, 686, 690, 380

[56] References Cited

U.S. PATENT DOCUMENTS

| | | | |
|---|---|---|---|
| 5,114,036 | 5/1992 | Liu | 361/380 X |
| 5,542,757 | 8/1996 | Chiang | 312/223.2 |
| 5,785,533 | 7/1998 | Baitz et al. | 361/686 X |
| 5,833,334 | 11/1998 | Harper | 312/257.1 |
| 5,924,782 | 7/1999 | Park | 312/223.2 X |
| 5,940,274 | 8/1999 | Sato et al. | 312/223.2 X |
| 5,947,570 | 9/1999 | Anderson et al. | 312/265.5 X |

*Primary Examiner*—Peter M. Cuomo
*Assistant Examiner*—Michael J. Fisher
*Attorney, Agent, or Firm*—Rosenberg, Klein & Lee

[57] ABSTRACT

A protective device for front panel of a PC comprises an opening on the front panel having two raised members on the bottom side, a pair of tabs spaced apart on the top side each having an opening, and a pair of grooved members on two opposite sides; a first cover Including two projections spaced apart on the bottom side and two tabs spaced apart on the top side each having a raised member thereon; and a second cover including a tab having two apertures on the bottom side, two protrusions on two opposite sides each having a raised member, and two slots spaced apart on the top side. By utilizing attachment of covers to front panel, a reliable engagement is achieved.

2 Claims, 6 Drawing Sheets

PROTECTIVE COVER FOR A FRONT PANEL OF A PERSONAL COMPUTER HOUSING

BACKGROUND OF THE INVENTION

1. Field of the Invention

The present invention relates to a protective cover for a front panel of a personal computer housing for secure protection of the housing.

2. Description of Related Art

The conventional attachment of a protective cover A for a personal computer (PC) housing is illustrated in FIG. 1, wherein two latched members A1 are provided on two opposite sides of protective cover A and engage the sides of opening B1 of front panel B so as to enable protective cover A to fit snugly against the opening B1.

It is found that such attachment is unsatisfactory for the following reasons:

1. The engagement of latched members A1 with opening B1 is not reliable.
2. The protective cover A is susceptible to separation from opening B1 when an external force is exerted on the front panel B.

As a result, the protection provided by the protective covers is compromised by the frequent separation of the protective cover A from opening B1. Further, such separation detracts from the housing's external appearance.

In view of the foregoing, it is desirable to provide a new and improved protective cover for a front panel of a PC housing in order to overcome the above drawbacks of the prior art.

SUMMARY OF THE INVENTION

It is an object of the present invention to provide a protective device for front panel of a personal computer housing comprising an opening on the front panel having two raised members on the bottom side, a pair of tabs spaced apart on the top side, each having an opening, and a pair of grooved members on two opposite sides thereof; a first protective cover including two projections spaced apart on the bottom side and two tabs spaced apart on the top side each having a raised member thereon; and a second protective cover including a tab having two apertures on the bottom side, two protrusions on two opposite sides each having a raised member, and two slots spaced apart on the top side. By utilizing the attachment of the first protective cover and the second protective cover to the front panel, a reliable and satisfactory engagement is achieved.

It is another object of the present invention to provide a protective device for a front panel of a personal computer housing having a simple and convenient assembly.

The above and other objects, features and advantages of the present invention will become apparent from the following detailed description taken with the accompanying drawings.

DETAILED DESCRIPTION OF THE PREFERRED EMBODIMENTS

Figure 1:
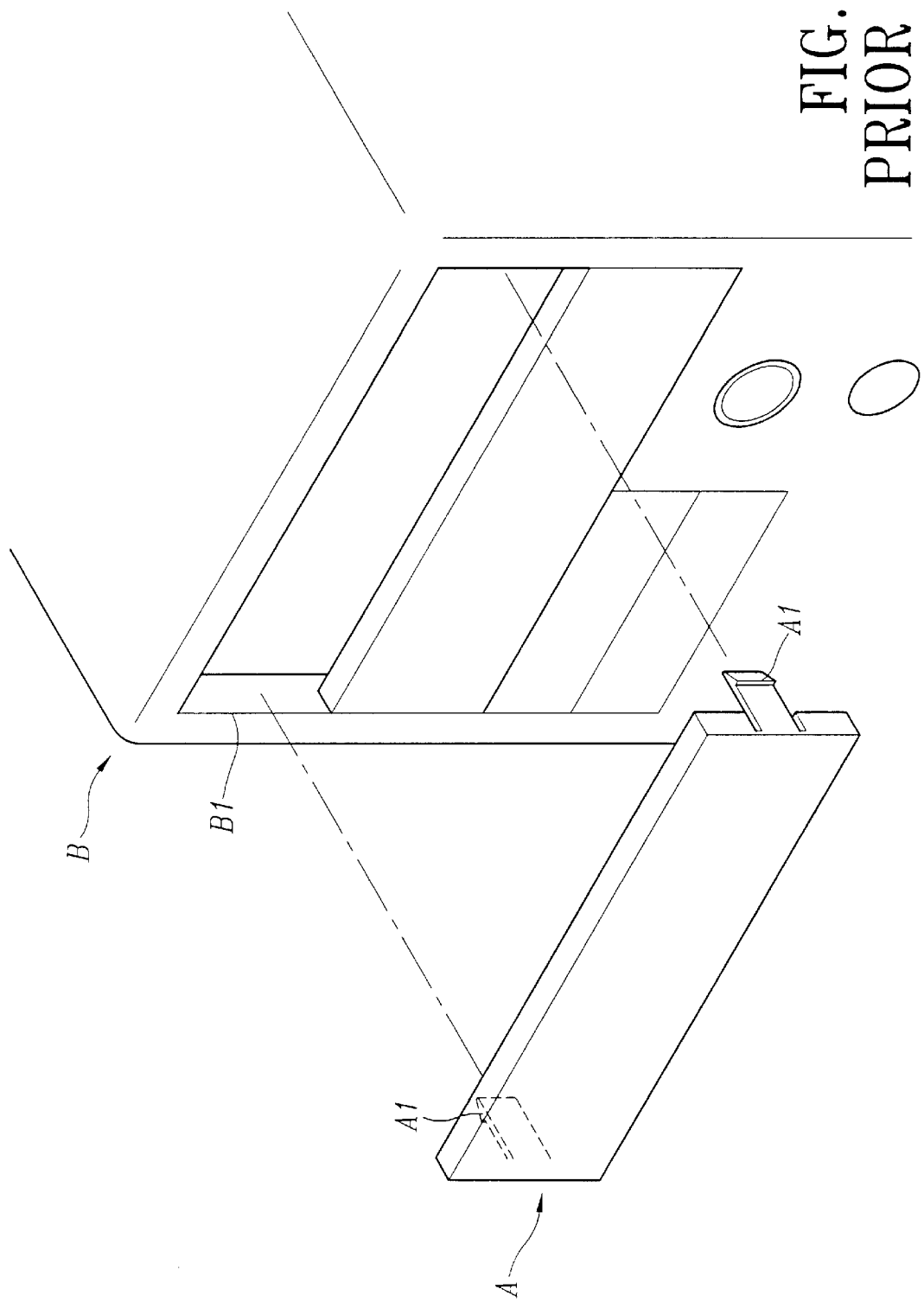
FIG. 1 is a perspective view of a conventional protective cover for a front panel of a PC housing in which one of the protective covers is separated from the housing for clarity of illustration.
Figure 2:
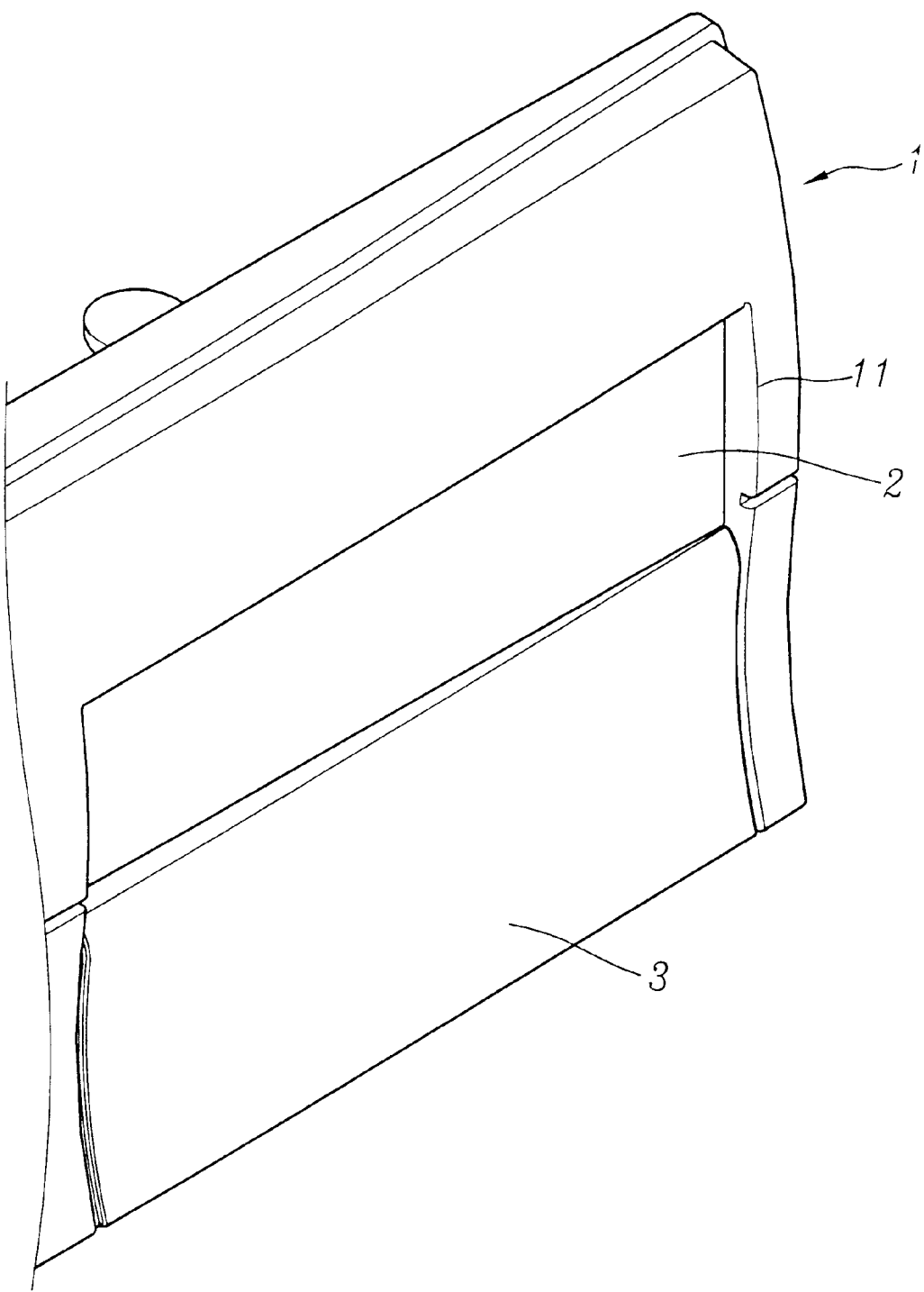
FIG. 2 is a perspective view of a protective cover according to a preferred embodiment of the present invention.
Figure 3:
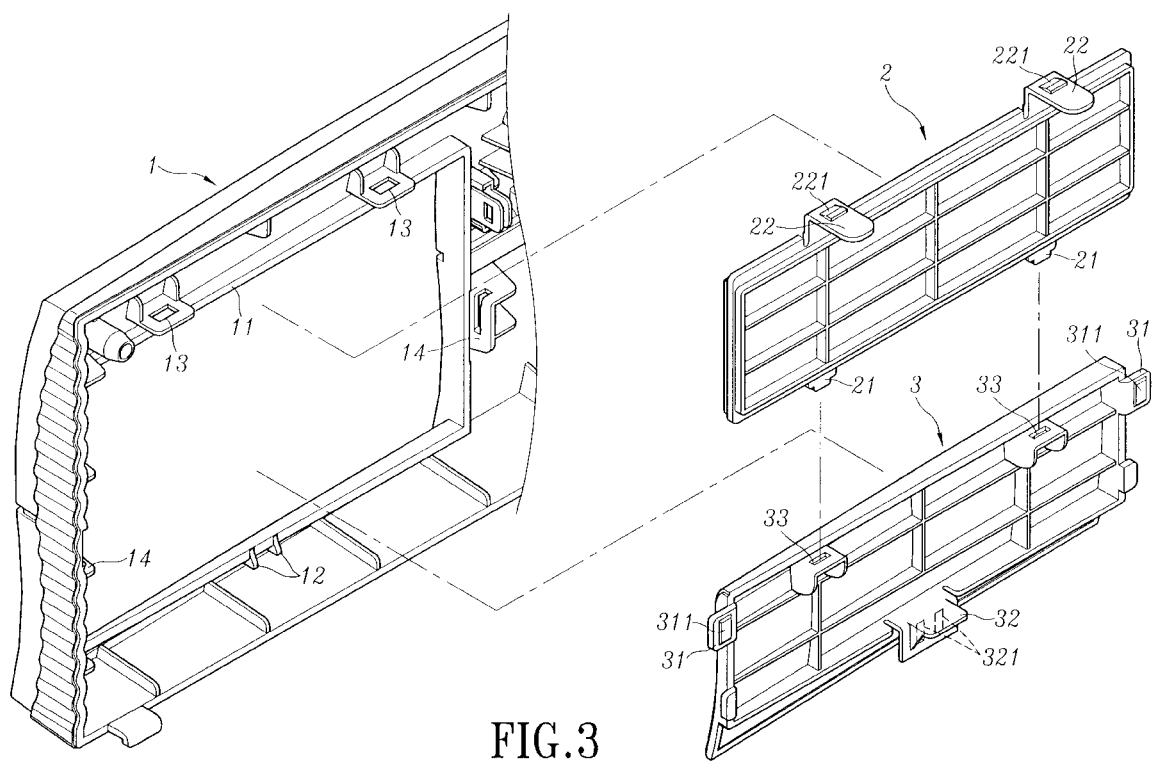
FIG. 3 is an exploded view of FIG. 2 taken from rear.
Figure 4:
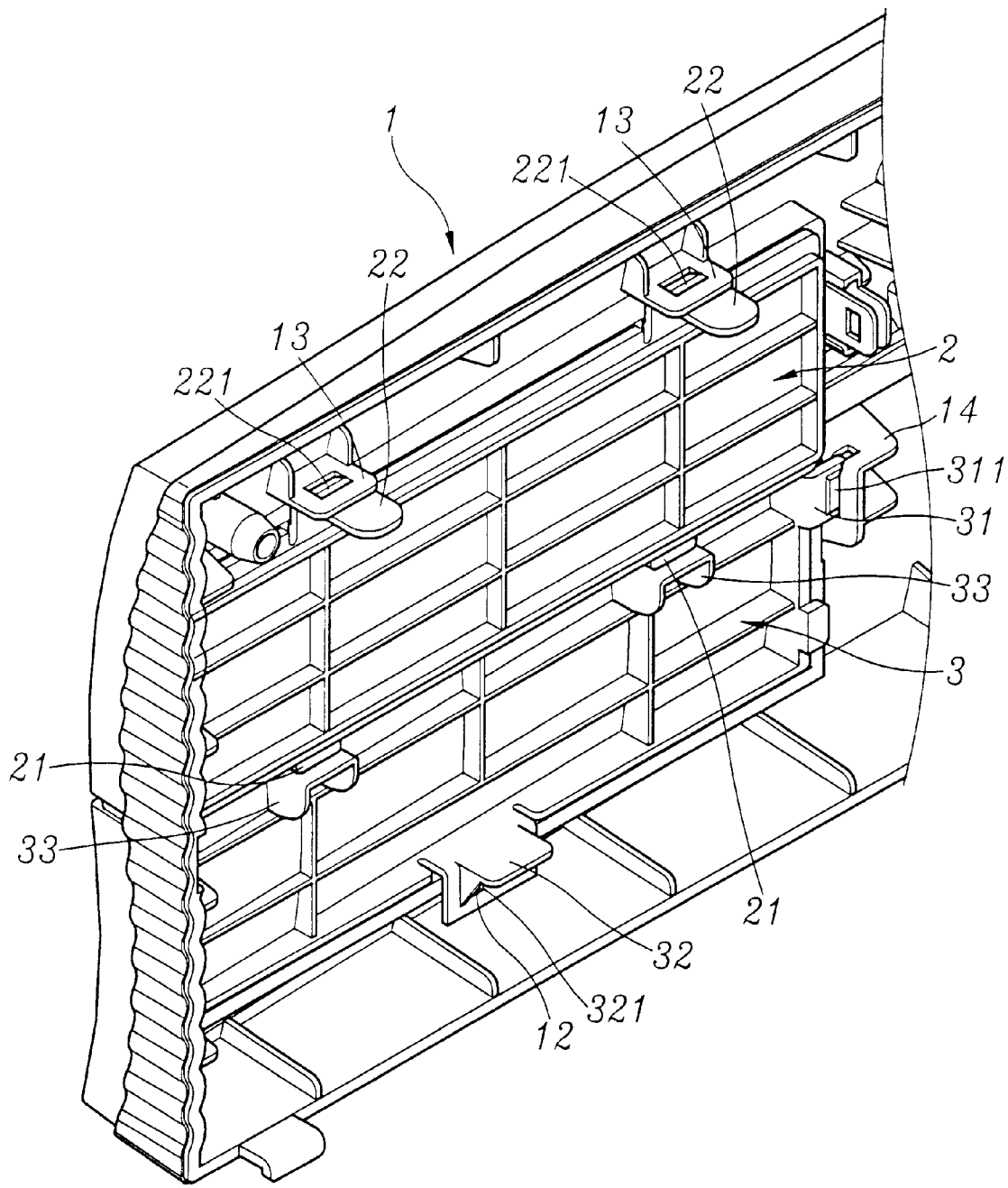
FIG. 4 is a perspective view of FIG. 3.

Referring to FIGS. 2–4, there is shown a protective cover consisting of a first protective cover 2 and a second protective cover 3 for a front panel 1 of a PC housing according to a preferred embodiment of the present invention.

Note that the first protective cover 2, second protective cover 3, and the front panel 1 all are made of plastic materials, thereby a minor bending or flexing thereof is possible.

An opening 11 is provided on the front panel 1 having two raised members 12 on the bottom side, a pair of tabs 13 spaced apart on the top side, each having an opening, and a pair of grooved members 14 on two opposite sides thereof, respectively.

First protective cover 2 includes two projections 21 spaced apart on the bottom side and two tabs 22 spaced apart on the top side, each having a raised member 221 thereon.

Second protective cover 3 includes a tab 32 having two apertures 321 on the bottom side, two protrusions 31 on two opposite sides, each having a raised member 311, and two slots 33 spaced apart on the top side.

Figure 5:
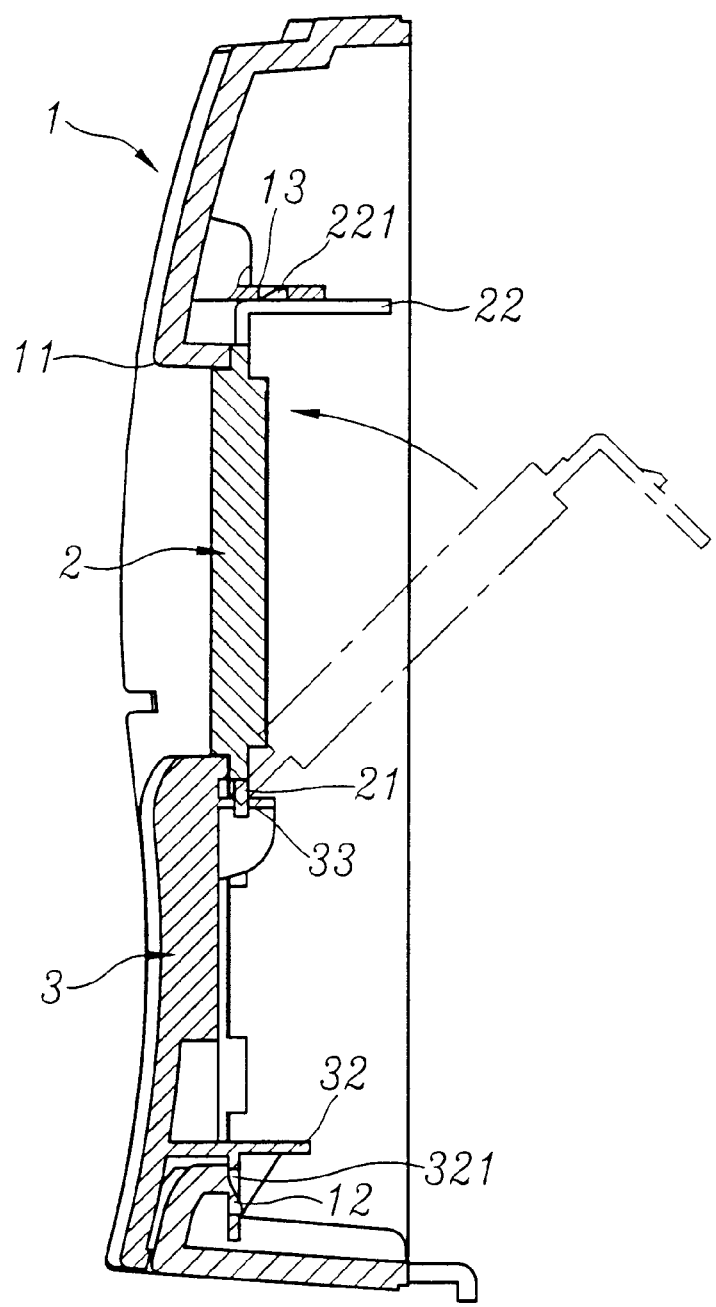
FIG. 5 is a sectional view of FIG. 2.
Figure 6:
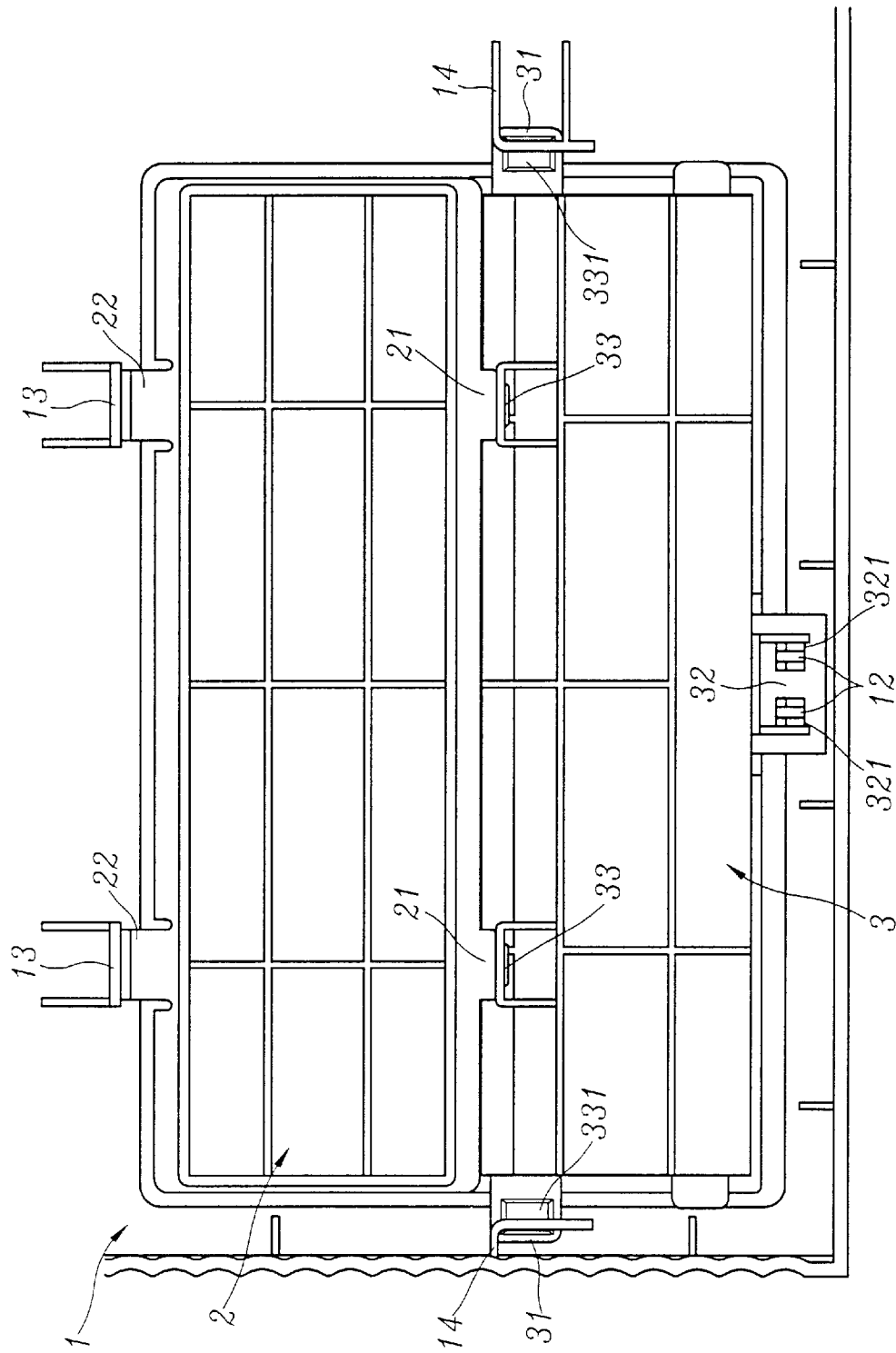
FIG. 6 is a rear view of FIG. 2.

FIGS. 5–6 illustrate the assembly of the first protective cover 2 and the second protective cover 3 within opening 11. First, the second protective cover 3 is slid down into opening 11 of front panel 1 with protrusions 31 engaging raised members 14 and raised members 12 are inserted into apertures 321 and engage with tab 32, respectively. Then, projections 21 of first protective cover 2 are inserted into slots 33 of the second protective cover 3. Last, first protective cover 2 is pushed toward front panel 1 so as to insert raised members 221 of tabs 22 into the openings of tabs 13 to finish the assembly.

ADVANTAGES OVER THE PRIOR ART

The attachment of the first protective cover 2 and the second protective cover 3 to front panel 1 of the invention is satisfactory for the following reasons:

There are an increased number of engagements among first protective cover 2, second protective cover 3, and front panel 1, thereby increasing the reliability.

As a result, first protective cover 2 and second protective cover 3 are not susceptible to separation from opening 11 when an external force is exerted on the front panel 1, thereby enhancing the protection provided by the protective covers. Further, the covers preserve the housing's appearance.

While the invention herein disclosed has been described by means of specific embodiments, numerous modifications and variations could be made thereto by those skilled in the art without departing from the scope of the invention set forth in the claims.

What is claimed is:

1. A front panel of a personal computer housing having an integrated protective device comprising:

an opening provided on said front panel having a plurality of raised members on a first bottom side, a pair of tabs spaced apart on a first top side, each having an opening, and a plurality of grooved members on a pair of first opposite sides;

a first protective cover including a plurality of projections spaced apart on a second bottom side and a pair of tabs spaced apart on a second top side, each having a raised member thereon; and a second protective cover including a tab having a plurality of apertures on a third bottom side, a plurality of protrusions on a pair of third opposite sides, each having a raised member, and a plurality of slots spaced apart on a third top side, whereby the second protective cover is slid down into the opening of said front panel with said protrusions engaging said raised members, said raised members being inserted into said apertures and engaging said tabs, respectively, said projections of said first protective cover being inserted into said slots of said second protective cover, said first protective cover being pushed toward said front panel so as to insert said raised members of said pair of tabs of said first protective cover into said openings of said pair of tabs of said front panel.

2. The front panel of a personal computer housing having an integrated protective device as recited in claim 1, wherein each of said first protective cover, said second protective cover, and said front panel is formed of a plastic material.

* * * * *